US012527613B2

(12) United States Patent
Muchnik et al.

(10) Patent No.: US 12,527,613 B2
(45) Date of Patent: Jan. 20, 2026

(54) CRYOPROBE

(71) Applicant: ICECURE MEDICAL LTD., Caesarea (IL)

(72) Inventors: Naum Muchnik, Yokneam Illit (IL); Ron Hilleli, Zichron Yaacov (IL); Adir Weiser, Nofit (IL); Adir Gadyukov, Haifa (IL)

(73) Assignee: IceCure Medical Ltd., Caesarea (IL)

( * ) Notice: Subject to any disclaimer, the term of this patent is extended or adjusted under 35 U.S.C. 154(b) by 229 days.

(21) Appl. No.: 18/464,309

(22) Filed: Sep. 11, 2023

(65) Prior Publication Data

US 2025/0082384 A1    Mar. 13, 2025

(51) Int. Cl.
*A61B 18/02* (2006.01)
*A61B 18/00* (2006.01)

(52) U.S. Cl.
CPC .... *A61B 18/02* (2013.01); *A61B 2018/00041* (2013.01); *A61B 2018/00577* (2013.01);
(Continued)

(58) Field of Classification Search
CPC ............... A61B 18/02; A61B 18/082; A61B 2018/00041; A61B 2018/00577; A61B 2018/00672; A61B 2018/00678; A61B 2018/00642; A61B 2018/00773; A61B 2018/00821; A61B 2018/00863;
(Continued)

(56) References Cited

U.S. PATENT DOCUMENTS 2,319,542 A    5/1943    Hall
2,888,879 A    6/1959    Gaarder
(Continued)

FOREIGN PATENT DOCUMENTS

CH          265929 A      12/1949
CN       101803947 B       9/2012
(Continued)

OTHER PUBLICATIONS

EP Application # 24198646.2 Search Report dated Feb. 12, 2025.
(Continued)

*Primary Examiner* — Ankit D Tejani
*Assistant Examiner* — Joshua Brendon Solomon
(74) *Attorney, Agent, or Firm* — Meitar Patents Ltd.; Daniel Kligler

(57) ABSTRACT

Apparatus, consisting of a probe with a probe distal end having an external surface that contacts tissue when the distal end is inserted into a patient. A heater and a temperature sensor are in the distal end, and a gas inlet is coupled to the distal end to provide gas. While the heater is activated, a controller registers a first time when a temperature measured by the sensor equals or exceeds a preset temperature, and, in response to the temperature equaling or exceeding the preset temperature, delivers a gas pulse through the gas inlet so as to cool the probe distal end. The controller then registers a second time when the temperature measured by the sensor equals or exceeds the preset temperature, and, in response to a time difference between the second and first times, estimates a temperature of the external surface of the probe distal end.

18 Claims, 8 Drawing Sheets

(52) U.S. Cl.
CPC ............... *A61B 2018/00821* (2013.01); *A61B 2018/0262* (2013.01); *A61B 2018/0293* (2013.01)

(58) Field of Classification Search
CPC .. A61B 2018/00898; A61B 2018/0262; A61B 2018/0293; A61B 2018/00666; A61B 2018/00696; A61B 2018/00714; A61B 2018/00744; A61B 2018/00791; A61B 2018/00011; A61B 2017/00154; A61B 2090/064; A61B 2217/007; F17C 7/02; F17C 2205/0352; F17C 2221/014; F17C 2223/0161; F17C 2223/033; F17C 2225/035; F17C 2250/0417; F17C 2250/043; F17C 2250/0631; F17C 2270/02; G06N 20/00; G01F 23/265; G01F 23/266; G01F 23/268; G01F 23/804

See application file for complete search history.

(56) References Cited

U.S. PATENT DOCUMENTS

| | | | |
|---|---|---|---|
| 3,234,746 | A | 2/1966 | Smith |
| 3,358,472 | A | 12/1967 | Kipling |
| 3,456,595 | A | 7/1969 | Gottzmann et al. |
| 3,664,344 | A | 5/1972 | Bryne |
| 3,696,813 | A | 10/1972 | Wallach |
| 3,699,775 | A | 10/1972 | Cowans |
| 3,712,306 | A | 1/1973 | Bryne |
| 3,736,936 | A | 6/1973 | Basilius et al. |
| 3,736,937 | A | 6/1973 | Basilius |
| 3,800,552 | A | 4/1974 | Sollami |
| 3,845,974 | A | 11/1974 | Pelloux-Gervais |
| 3,862,630 | A | 1/1975 | Balamuth |
| 3,882,849 | A | 5/1975 | Smith |
| 3,938,505 | A | 2/1976 | Jamshidi |
| 3,958,443 | A | 5/1976 | Berrettini |
| 3,971,383 | A | 7/1976 | Van Gerven |
| 3,988,029 | A | 10/1976 | Gibson |
| 4,082,096 | A | 4/1978 | Benson |
| 4,091,634 | A | 5/1978 | Shepherd |
| 4,107,946 | A | 8/1978 | Potter |
| 4,127,903 | A | 12/1978 | Schachar |
| 4,200,104 | A | 4/1980 | Harris |
| 4,202,336 | A | 5/1980 | Van Gerven |
| 4,211,231 | A | 7/1980 | Rzasa |
| 4,279,626 | A | 7/1981 | Buchmuller |
| 4,306,568 | A | 12/1981 | Torre |
| 4,313,306 | A | 2/1982 | Torre |
| 4,367,744 | A | 1/1983 | Sole |
| 4,376,376 | A | 3/1983 | Gregory |
| 4,428,748 | A | 1/1984 | Peyman |
| 4,463,458 | A | 8/1984 | Seidner |
| 4,481,948 | A | 11/1984 | Sole |
| 4,487,253 | A | 12/1984 | Malek |
| 4,541,457 | A | 9/1985 | Blenkush |
| 4,545,367 | A | 10/1985 | Tucci |
| 4,552,208 | A | 11/1985 | Sorenson |
| 4,570,626 | A | 2/1986 | Norris |
| 4,573,525 | A | 3/1986 | Boyd |
| 4,611,654 | A | 9/1986 | Buchsel |
| 4,613,112 | A | 9/1986 | Phlipot et al. |
| 4,617,018 | A | 10/1986 | Nishi |
| 4,676,225 | A | 6/1987 | Bartera |
| 4,724,834 | A | 2/1988 | Alperovich et al. |
| 4,726,194 | A | 2/1988 | Mackay |
| 4,765,396 | A | 8/1988 | Seidenberg |
| 4,770,171 | A | 9/1988 | Sweren |
| 4,802,475 | A | 2/1989 | Weshahy |
| 4,823,790 | A | 4/1989 | Alperovich et al. |
| 4,831,856 | A | 5/1989 | Gano |
| 4,832,022 | A | 5/1989 | Tjulkov et al. |
| 4,946,460 | A | 8/1990 | Merry et al. |
| 5,026,387 | A | 6/1991 | Thomas |
| 5,047,043 | A | 9/1991 | Kubota |
| 5,108,390 | A | 4/1992 | Potocky |
| 5,147,355 | A | 9/1992 | Friedman |
| 5,188,102 | A | 2/1993 | Idemoto |
| 5,214,925 | A | 6/1993 | Hoy |
| 5,222,937 | A | 6/1993 | Kagawa |
| 5,224,943 | A | 7/1993 | Goddard |
| 5,243,826 | A | 9/1993 | Longsworth |
| 5,254,082 | A | 10/1993 | Takase |
| 5,254,116 | A | 10/1993 | Baust |
| 5,261,923 | A | 11/1993 | Soares |
| 5,263,957 | A | 11/1993 | Davison |
| 5,264,116 | A | 11/1993 | Apelian |
| 5,267,960 | A | 12/1993 | Hayman et al. |
| 5,275,595 | A | 1/1994 | Dobak |
| 5,281,215 | A | 1/1994 | Milder |
| 5,295,484 | A | 3/1994 | Marcus |
| 5,324,286 | A | 6/1994 | Fowle |
| 5,330,745 | A | 7/1994 | Mcdow |
| 5,334,181 | A | 8/1994 | Rubinsky et al. |
| 5,342,380 | A | 8/1994 | Hood |
| 5,361,591 | A | 11/1994 | Caldwell |
| 5,363,879 | A | 11/1994 | Rhoades |
| 5,391,144 | A | 2/1995 | Sakurai |
| 5,411,374 | A | 5/1995 | Gram |
| 5,417,073 | A | 5/1995 | James |
| 5,423,807 | A | 6/1995 | Milder |
| 5,429,138 | A | 7/1995 | Jamshidi |
| 5,429,155 | A | 7/1995 | Brzyski et al. |
| 5,438,837 | A | 8/1995 | Caldwell |
| 5,441,512 | A | 8/1995 | Muller |
| 5,445,462 | A | 8/1995 | Johnson |
| 5,452,582 | A | 9/1995 | Longsworth |
| 5,488,831 | A | 2/1996 | Griswold |
| 5,516,505 | A | 5/1996 | Mcdow |
| 5,520,682 | A | 5/1996 | Baust |
| 5,522,870 | A | 6/1996 | Ben-Zion |
| 5,526,821 | A | 6/1996 | Jamshidi |
| 5,547,473 | A | 8/1996 | Peyman |
| 5,573,532 | A | 11/1996 | Chang |
| 5,600,143 | A | 2/1997 | Roberts |
| 5,603,221 | A | 2/1997 | Maytal |
| 5,616,838 | A | 4/1997 | Preston et al. |
| 5,620,479 | A | 4/1997 | Diederich |
| 5,632,743 | A | 5/1997 | Clarke |
| 5,647,868 | A | 7/1997 | Chinn |
| 5,654,279 | A | 8/1997 | Rubinsky |
| 5,658,276 | A | 8/1997 | Griswold |
| 5,674,218 | A | 10/1997 | Rubinsky et al. |
| 5,683,592 | A | 11/1997 | Bartholomew |
| 5,687,776 | A | 11/1997 | Forgash |
| 5,716,353 | A | 2/1998 | Matsuura |
| 5,720,743 | A | 2/1998 | Bischof |
| 5,728,130 | A | 3/1998 | Ishikawa |
| 5,735,845 | A | 4/1998 | Zupkas |
| 5,771,946 | A | 6/1998 | Kooy |
| 5,787,940 | A | 8/1998 | Bonn |
| 5,800,448 | A | 9/1998 | Banko |
| 5,800,487 | A | 9/1998 | Mikus |
| 5,814,040 | A | 9/1998 | Nelson |
| 5,860,970 | A | 1/1999 | Goddard et al. |
| 5,860,971 | A | 1/1999 | Clarke |
| 5,868,673 | A | 2/1999 | Vesely |
| 5,885,276 | A | 3/1999 | Ammar |
| 5,899,897 | A | 5/1999 | Rabin |
| 5,906,612 | A | 5/1999 | Chinn |
| 5,906,628 | A | 5/1999 | Miyawaki |
| 5,910,104 | A | 6/1999 | Dobak et al. |
| 5,921,982 | A | 7/1999 | Lesh |
| 5,935,124 | A | 8/1999 | Klumb et al. |
| 5,946,920 | A | 9/1999 | Clarke |
| 5,957,918 | A | 9/1999 | Griswold |
| 5,976,092 | A | 11/1999 | Chinn |
| 5,976,505 | A | 11/1999 | Henderson |
| 5,992,158 | A | 11/1999 | Goddard et al. |
| 6,007,571 | A | 12/1999 | Neilson et al. |
| 6,012,453 | A | 1/2000 | Tsais |
| 6,024,750 | A | 2/2000 | Mastri |

(56) References Cited

U.S. PATENT DOCUMENTS

| | | | |
|---|---|---|---|
| 6,027,499 A | 2/2000 | Johnston et al. |
| 6,032,068 A | 2/2000 | Daniel |
| 6,032,675 A | 3/2000 | Rubinsky |
| 6,035,646 A | 3/2000 | Griswold |
| 6,035,657 A | 3/2000 | Dobak |
| 6,036,667 A | 3/2000 | Manna |
| 6,039,730 A | 3/2000 | Rabin |
| 6,041,787 A | 3/2000 | Rubinsky |
| 6,042,342 A | 3/2000 | Orian |
| 6,053,906 A | 4/2000 | Honda |
| 6,059,820 A | 5/2000 | Baronov |
| 6,063,098 A | 5/2000 | Houser |
| 6,074,412 A | 6/2000 | Mikus et al. |
| 6,082,400 A | 7/2000 | Tocha |
| 6,095,149 A | 8/2000 | Sharkey |
| 6,123,675 A | 9/2000 | Kreizman et al. |
| 6,142,991 A | 11/2000 | Schatzberger |
| 6,145,322 A | 11/2000 | Odashima |
| 6,152,894 A | 11/2000 | Kubler |
| 6,182,666 B1 | 2/2001 | Dobak |
| 6,183,019 B1 | 2/2001 | Owen |
| 6,190,378 B1 | 2/2001 | Jarvinen |
| 6,200,308 B1 | 3/2001 | Pope |
| 6,203,288 B1 | 3/2001 | Kottke |
| 6,206,832 B1 | 3/2001 | Downey |
| 6,212,904 B1 | 4/2001 | Arkharov |
| 6,216,029 B1 | 4/2001 | Paltieli |
| 6,235,018 B1 | 5/2001 | LePivert |
| 6,235,019 B1 | 5/2001 | Lehmann et al. |
| 6,237,355 B1 | 5/2001 | Li |
| 6,251,105 B1 | 6/2001 | Mikus |
| 6,270,494 B1 | 8/2001 | Kovalcheck |
| 6,280,407 B1 | 8/2001 | Manna |
| 6,354,088 B1 | 3/2002 | Emmer |
| 6,355,033 B1 | 3/2002 | Moorman |
| 6,358,264 B2 | 3/2002 | Banko |
| 6,379,348 B1 | 4/2002 | Onik |
| 6,383,180 B1 | 5/2002 | Lalonde |
| 6,383,181 B1 | 5/2002 | Johnston |
| 6,411,852 B1 | 6/2002 | Danek |
| 6,413,263 B1 | 7/2002 | Lobdill |
| 6,423,009 B1 | 7/2002 | Downey |
| 6,432,102 B2 | 8/2002 | Joye |
| 6,457,212 B1 | 10/2002 | Craig |
| 6,468,268 B1 | 10/2002 | Abboud |
| 6,468,269 B1 | 10/2002 | Korpan |
| 6,471,217 B1 | 10/2002 | Hayfield |
| 6,471,694 B1 | 10/2002 | Kudaravalli et al. |
| 6,482,178 B1 | 11/2002 | Andrews |
| 6,497,714 B1 | 12/2002 | Ishikawa |
| 6,500,109 B2 | 12/2002 | Tokita |
| 6,500,172 B1 | 12/2002 | Panescu et al. |
| 6,503,246 B1 | 1/2003 | Har-Shai |
| 6,505,629 B1 | 1/2003 | Mikus et al. |
| 6,508,814 B2 | 1/2003 | Tortal |
| 6,513,336 B2 | 2/2003 | Zurecki |
| 6,547,784 B1 | 4/2003 | Thompson |
| 6,551,309 B1 | 4/2003 | LePivert |
| 6,562,030 B1 | 5/2003 | Abboud |
| 6,565,556 B1 | 5/2003 | Korpan |
| 6,581,390 B2 | 6/2003 | Emmer |
| 6,582,425 B2 | 6/2003 | Simpson |
| 6,582,426 B2 | 6/2003 | Moorman |
| 6,631,615 B2 | 10/2003 | Drube |
| 6,640,556 B2 | 11/2003 | Ursan |
| 6,659,730 B2 | 12/2003 | Gram et al. |
| 6,659,956 B2 | 12/2003 | Barzell |
| 6,672,095 B1 | 1/2004 | Luo |
| 6,678,621 B2 | 1/2004 | Wiener |
| 6,682,525 B2 | 1/2004 | Lalonde et al. |
| 6,698,423 B1 | 3/2004 | Honkonen |
| 6,702,761 B1 | 3/2004 | Damadian |
| 6,706,037 B2 | 3/2004 | Zvuloni et al. |
| 6,761,715 B2 | 7/2004 | Carroll |
| 6,765,333 B1 | 7/2004 | Mariaucue |
| 6,768,917 B1 | 7/2004 | Van Vaals |
| 6,772,766 B2 | 8/2004 | Gallo |
| 6,786,902 B1 | 9/2004 | Rabin |
| 6,789,545 B2 | 9/2004 | Littrup et al. |
| 6,824,543 B2 | 11/2004 | Lentz |
| 6,852,110 B2 | 2/2005 | Roy et al. |
| 6,852,706 B1 | 2/2005 | Heber-Katz |
| 6,858,025 B2 | 2/2005 | Maurice |
| 6,866,624 B2 | 3/2005 | Chornenky et al. |
| 6,869,439 B2 | 3/2005 | White |
| 6,889,695 B2 | 5/2005 | Pankratov |
| 6,898,940 B2 | 5/2005 | Gram |
| 6,908,472 B2 | 6/2005 | Wiener |
| 6,910,510 B2 | 6/2005 | Gale |
| 6,913,604 B2 | 7/2005 | Mihalik |
| 6,918,869 B2 | 7/2005 | Shaw et al. |
| 6,929,639 B2 | 8/2005 | Lafontaine |
| 6,932,771 B2 | 8/2005 | Whitmore |
| 6,936,045 B2 | 8/2005 | Yu |
| 6,939,346 B2 | 9/2005 | Kannenberg et al. |
| 6,942,659 B2 | 9/2005 | Lehmann |
| 6,945,477 B2 | 9/2005 | Lambert et al. |
| 6,951,569 B2 | 10/2005 | Nohilly |
| 6,954,977 B2 | 10/2005 | Maguire |
| 6,995,493 B2 | 2/2006 | Isoda |
| 7,001,378 B2 | 2/2006 | Yon |
| 7,025,762 B2 | 4/2006 | Johnston |
| 7,025,767 B2 | 4/2006 | Schaefer |
| 7,071,690 B2 | 7/2006 | Butts |
| 7,081,111 B2 | 7/2006 | Svaasand |
| 7,083,612 B2 | 8/2006 | Littrup et al. |
| 7,101,367 B2 | 9/2006 | Xiao |
| 7,128,347 B2 | 10/2006 | Kerin |
| 7,128,738 B2 | 10/2006 | Littrup et al. |
| 7,128,739 B2 | 10/2006 | Prakash |
| 7,137,978 B2 | 11/2006 | Levin |
| 7,144,228 B2 | 12/2006 | Emmer |
| 7,151,374 B2 | 12/2006 | Doty |
| 7,156,840 B2 | 1/2007 | Lentz et al. |
| 7,160,291 B2 | 1/2007 | Damasco |
| 7,160,292 B2 | 1/2007 | Moorman |
| 7,165,422 B2 | 1/2007 | Little |
| 7,189,228 B2 | 3/2007 | Eum |
| 7,192,426 B2 | 3/2007 | Baust et al. |
| 7,207,985 B2 | 4/2007 | Duong |
| 7,213,400 B2 | 5/2007 | Dickerson |
| 7,223,080 B2 | 5/2007 | Duron |
| 7,250,046 B1 | 7/2007 | Fallat |
| 7,252,648 B2 | 8/2007 | Honda |
| 7,255,693 B1 | 8/2007 | Johnston |
| 7,273,479 B2 | 9/2007 | Littrup et al. |
| 7,278,991 B2 | 10/2007 | Morris |
| 7,280,623 B2 | 10/2007 | Gupta |
| 7,282,919 B2 | 10/2007 | Doty |
| 7,288,089 B2 | 10/2007 | Yon |
| 7,318,327 B2 | 1/2008 | Dickerson |
| 7,344,530 B2 | 3/2008 | Bischof |
| 7,344,531 B2 | 3/2008 | Bischof |
| 7,354,434 B2 | 4/2008 | Zvuloni |
| 7,357,797 B2 | 4/2008 | Ryba |
| 7,361,187 B2 | 4/2008 | Duong |
| 7,381,207 B2 | 6/2008 | Duong |
| 7,407,501 B2 | 8/2008 | Zvuloni |
| 7,422,583 B2 | 9/2008 | Maurice |
| 7,425,211 B2 | 9/2008 | Levin et al. |
| 7,458,379 B2 | 12/2008 | Littrup et al. |
| 7,458,968 B2 | 12/2008 | Carroll |
| 7,469,718 B2 | 12/2008 | Lambert et al. |
| 7,481,806 B2 | 1/2009 | Levin |
| 7,485,117 B2 | 2/2009 | Damasco |
| 7,498,812 B2 | 3/2009 | Doty |
| 7,510,554 B2 | 3/2009 | Duong |
| 7,563,260 B2 | 7/2009 | Whitmore |
| 7,568,735 B2 | 8/2009 | Akiba |
| 7,731,711 B2 | 6/2010 | Levin |
| 7,780,657 B2 | 8/2010 | Abboud et al. |
| 7,803,154 B2 | 9/2010 | Toubia et al. |
| 7,921,657 B2 | 4/2011 | Littrup et al. |
| 7,938,822 B1 | 5/2011 | Berzak et al. |

(56) References Cited

U.S. PATENT DOCUMENTS

| | | |
|---|---|---|
| 7,967,814 B2 | 6/2011 | Levin |
| 7,967,815 B1 | 6/2011 | Berzak et al. |
| 8,080,005 B1 | 12/2011 | Berzak et al. |
| 8,092,448 B2 | 1/2012 | DeLonzor |
| 8,162,812 B2 | 4/2012 | Shai et al. |
| 8,187,264 B2 | 5/2012 | Kobayashi |
| 8,348,855 B2 | 1/2013 | Hillely et al. |
| 8,418,480 B2 | 4/2013 | Danley et al. |
| 8,475,448 B2 | 7/2013 | Sharareh et al. |
| 8,500,173 B2 | 8/2013 | Zahler et al. |
| 8,517,749 B2 | 8/2013 | Marshall |
| 8,551,081 B2 | 10/2013 | Baust et al. |
| 8,579,892 B2 | 11/2013 | Hoey et al. |
| 8,591,505 B2 | 11/2013 | Sharon et al. |
| 8,671,700 B2 | 3/2014 | Duong et al. |
| 8,685,014 B2 | 4/2014 | Babkin et al. |
| 8,709,005 B2 | 4/2014 | Berzak et al. |
| 8,784,409 B2 | 7/2014 | Robilotto et al. |
| 8,814,850 B2 | 8/2014 | Babkin et al. |
| 8,845,628 B2 | 9/2014 | Babkin et al. |
| 8,906,004 B2 | 12/2014 | Berzak et al. |
| 8,998,888 B2 | 4/2015 | Baust et al. |
| 9,039,689 B2 | 5/2015 | Berzak et al. |
| 9,050,072 B2 | 6/2015 | Delonzor et al. |
| 9,050,075 B2 | 6/2015 | Berzak et al. |
| 9,101,343 B2 | 8/2015 | Duong et al. |
| 9,125,689 B2 | 9/2015 | Mielekamp |
| 9,144,461 B2 | 9/2015 | Kruecker et al. |
| 9,157,560 B2 | 10/2015 | Rehder et al. |
| 9,237,919 B2 | 1/2016 | Maschke |
| 9,316,215 B2 | 4/2016 | Mackey |
| 9,408,654 B2 | 8/2016 | Baust et al. |
| 9,441,997 B2 | 9/2016 | Downie et al. |
| 9,808,302 B2 | 11/2017 | Berzak et al. |
| 9,956,024 B2 | 5/2018 | Mahrouche et al. |
| 10,022,175 B2 | 7/2018 | Abboud et al. |
| 10,054,262 B2 | 8/2018 | Baust et al. |
| 10,098,685 B2 | 10/2018 | Lalonde et al. |
| 10,125,771 B2 | 11/2018 | Caldwell et al. |
| 10,159,522 B2 | 12/2018 | Littrup et al. |
| 10,213,244 B2 | 2/2019 | Fourkas et al. |
| 10,363,081 B2 | 7/2019 | Clarke |
| 10,383,686 B2 | 8/2019 | Panescu et al. |
| 10,390,871 B2 | 8/2019 | Ramadhyani et al. |
| 10,485,602 B2 | 11/2019 | Geiselhart |
| 10,531,656 B2 | 1/2020 | Schryver |
| 10,702,251 B2 | 7/2020 | Nevo |
| 10,828,080 B2 | 11/2020 | George et al. |
| 10,859,211 B2 | 12/2020 | Bollinger |
| 11,026,737 B2 | 6/2021 | Baust et al. |
| 11,060,778 B2 | 7/2021 | Jankowsky et al. |
| 11,266,458 B2 | 3/2022 | Perron et al. |
| 11,413,085 B2 | 8/2022 | Snyder et al. |
| 2001/0047129 A1 | 11/2001 | Hall |
| 2002/0016540 A1 | 2/2002 | Mikus |
| 2002/0022832 A1 | 2/2002 | Mikus |
| 2002/0040220 A1 | 4/2002 | Zvuloni et al. |
| 2002/0042609 A1 | 4/2002 | Kelman et al. |
| 2002/0077654 A1 | 6/2002 | Javier |
| 2002/0085921 A1 | 7/2002 | Gram |
| 2002/0144509 A1 | 10/2002 | Chalk |
| 2002/0156469 A1 | 10/2002 | Yon |
| 2002/0157402 A1 | 10/2002 | Drube |
| 2002/0160640 A1 | 10/2002 | Korpan |
| 2002/0161385 A1 | 10/2002 | Wiener |
| 2003/0060762 A1 | 3/2003 | Zvuloni |
| 2003/0079480 A1 | 5/2003 | Emmer |
| 2003/0126867 A1 | 7/2003 | Drube |
| 2003/0135119 A1 | 7/2003 | Lee |
| 2003/0181897 A1 | 9/2003 | Thomas |
| 2003/0220635 A1 | 11/2003 | Knowlton et al. |
| 2004/0024391 A1 | 2/2004 | Cytron |
| 2004/0024392 A1 | 2/2004 | Lewis et al. |
| 2004/0055316 A1 | 3/2004 | Emmer |
| 2004/0078033 A1 | 4/2004 | Levin et al. |
| 2004/0106841 A1 | 6/2004 | Shaw et al. |
| 2004/0210212 A1 | 10/2004 | Maurice |
| 2004/0215178 A1 | 10/2004 | Maurice |
| 2005/0016185 A1 | 1/2005 | Emmer |
| 2005/0038422 A1 | 2/2005 | Maurice |
| 2005/0043725 A1 | 2/2005 | Duong et al. |
| 2005/0056027 A1 | 3/2005 | White |
| 2005/0086949 A1 | 4/2005 | Noble |
| 2005/0106153 A1 | 5/2005 | Nordouist |
| 2005/0159735 A1 | 7/2005 | Walton et al. |
| 2005/0177147 A1 | 8/2005 | Vancelette |
| 2005/0192564 A1 | 9/2005 | Cosman |
| 2005/0198972 A1 | 9/2005 | Lentz et al. |
| 2005/0214268 A1 | 9/2005 | Cavanagh |
| 2005/0274127 A1 | 12/2005 | Drube et al. |
| 2005/0274142 A1 | 12/2005 | Corey |
| 2005/0288658 A1 | 12/2005 | Littrup et al. |
| 2006/0049274 A1 | 3/2006 | Hume |
| 2006/0053165 A1 | 3/2006 | Hume |
| 2006/0079867 A1 | 4/2006 | Berzak et al. |
| 2006/0100495 A1 | 5/2006 | Santoianni et al. |
| 2006/0122590 A1 | 6/2006 | Bliweis |
| 2006/0155267 A1 | 7/2006 | Berzak |
| 2006/0155268 A1 | 7/2006 | Amir |
| 2006/0253114 A1 | 11/2006 | Saadat |
| 2006/0264920 A1 | 11/2006 | Duong |
| 2006/0293647 A1 | 12/2006 | McRae |
| 2007/0000259 A1 | 1/2007 | Brook |
| 2007/0043342 A1 | 2/2007 | Kleinberger |
| 2007/0088217 A1 | 4/2007 | Babaev |
| 2007/0093710 A1 | 4/2007 | Maschke |
| 2007/0123815 A1 | 5/2007 | Mark |
| 2007/0129626 A1 | 6/2007 | Mahesh et al. |
| 2007/0129629 A1 | 6/2007 | Beauregard |
| 2007/0149959 A1 | 6/2007 | DeLonzor |
| 2007/0153969 A1 | 7/2007 | Maschke |
| 2007/0166171 A1 | 7/2007 | Kondo |
| 2007/0167939 A1 | 7/2007 | Duong |
| 2007/0244474 A1 | 10/2007 | DeLonzor et al. |
| 2007/0276360 A1 | 11/2007 | Johnston |
| 2007/0277550 A1 | 12/2007 | Li et al. |
| 2008/0027419 A1 | 1/2008 | Hamel |
| 2008/0039745 A1 | 2/2008 | Babaev |
| 2008/0051774 A1 | 2/2008 | Ofir |
| 2008/0051776 A1 | 2/2008 | Bliweis |
| 2008/0097251 A1 | 4/2008 | Babaev |
| 2008/0114344 A1 | 5/2008 | Xiao et al. |
| 2008/0114346 A1 | 5/2008 | Levin et al. |
| 2008/0115509 A1 | 5/2008 | Gullickson |
| 2008/0119834 A1 | 5/2008 | Vancelette |
| 2008/0119838 A1 | 5/2008 | Vancelette |
| 2008/0125764 A1 | 5/2008 | Vancelette et al. |
| 2008/0140061 A1 | 6/2008 | Toubia et al. |
| 2008/0319433 A1 | 12/2008 | Geiselhart |
| 2009/0011032 A1 | 1/2009 | LePivert |
| 2009/0149957 A1 | 6/2009 | Ross et al. |
| 2009/0163902 A1 | 6/2009 | DeLonzor et al. |
| 2009/0182320 A1 | 7/2009 | DeLonzor et al. |
| 2009/0192505 A1 | 7/2009 | Askew et al. |
| 2010/0057063 A1 | 3/2010 | Arless et al. |
| 2010/0256621 A1 | 10/2010 | Babkin et al. |
| 2010/0256642 A1 | 10/2010 | Stone |
| 2011/0082351 A1 | 4/2011 | Razzaque et al. |
| 2011/0306958 A1 | 12/2011 | Berzak et al. |
| 2012/0007352 A1 | 1/2012 | Nguyen et al. |
| 2012/0316558 A1 | 12/2012 | Hendriks et al. |
| 2013/0103020 A1 | 4/2013 | Levin |
| 2014/0169993 A1 | 6/2014 | Berzak et al. |
| 2014/0194863 A1 | 7/2014 | Berzak et al. |
| 2014/0350537 A1 | 11/2014 | Baust et al. |
| 2015/0126987 A1 | 5/2015 | Semenov et al. |
| 2015/0257810 A1 | 9/2015 | Baust et al. |
| 2015/0300344 A1 | 10/2015 | Berzak et al. |
| 2016/0135864 A1 | 5/2016 | Babkin et al. |
| 2016/0249970 A1 | 9/2016 | Yu et al. |
| 2019/0175395 A1 | 6/2019 | Kim |
| 2019/0254731 A9 | 8/2019 | Sperling et al. |
| 2019/0290348 A1 | 9/2019 | Clarke |
| 2019/0328437 A1 | 10/2019 | Perron et al. |

(56) References Cited

U.S. PATENT DOCUMENTS

| | | |
|---|---|---|
| 2019/0390822 A1 | 12/2019 | Brothers |
| 2020/0015750 A1 | 1/2020 | Pike et al. |
| 2020/0015878 A1* | 1/2020 | Krimsky .............. A61B 18/02 |
| 2020/0121498 A1 | 4/2020 | Baust et al. |
| 2020/0297403 A1 | 9/2020 | Kochavi |
| 2020/0378556 A1 | 12/2020 | Wowk et al. |
| 2021/0161577 A1 | 6/2021 | Johansson |
| 2021/0177482 A1 | 6/2021 | Tegg et al. |
| 2021/0177483 A1 | 6/2021 | Tegg et al. |
| 2021/0239257 A1 | 8/2021 | Stautner |
| 2021/0244457 A1 | 8/2021 | Hilleli et al. |
| 2021/0369319 A1 | 12/2021 | Sprain et al. |
| 2021/0396336 A1 | 12/2021 | Schroeter |
| 2022/0287757 A1 | 9/2022 | Gong et al. |
| 2022/0304737 A1 | 9/2022 | Pang et al. |
| 2023/0210575 A1 | 7/2023 | Hilleli et al. |
| 2023/0213129 A1 | 7/2023 | Peabody et al. |
| 2023/0270483 A1 | 8/2023 | Hilleli et al. |
| 2023/0381015 A1 | 11/2023 | Hilleli et al. |

FOREIGN PATENT DOCUMENTS

| | | |
|---|---|---|
| CN | 102488550 B | 4/2013 |
| CN | 203122580 U | 8/2013 |
| CN | 203641719 U | 6/2014 |
| CN | 203873871 U | 10/2014 |
| CN | 204219026 U | 3/2015 |
| CN | 104605925 A | 5/2015 |
| CN | 204797984 U | 11/2015 |
| CN | 103784193 B | 12/2015 |
| CN | 207870952 U | 9/2018 |
| CN | 208511163 U | 2/2019 |
| CN | 208541399 U | 2/2019 |
| CN | 109431595 B | 3/2019 |
| CN | 109674525 A | 4/2019 |
| CN | 208677560 U | 4/2019 |
| CN | 208693430 U | 4/2019 |
| CN | 208693431 U | 4/2019 |
| CN | 209032618 U | 6/2019 |
| CN | 109984734 A | 7/2019 |
| CN | 209059412 U | 7/2019 |
| CN | 209153957 U | 7/2019 |
| CN | 209301311 U | 8/2019 |
| CN | 209326130 U | 8/2019 |
| CN | 110236671 A | 9/2019 |
| CN | 209360883 U | 9/2019 |
| CN | 209470383 U | 10/2019 |
| CN | 209574862 U | 11/2019 |
| CN | 209751207 U | 12/2019 |
| CN | 209826947 U | 12/2019 |
| CN | 209826949 U | 12/2019 |
| CN | 209842088 U | 12/2019 |
| CN | 209847361 U | 12/2019 |
| CN | 110251224 B | 2/2020 |
| CN | 210019627 U | 2/2020 |
| CN | 210019628 U | 2/2020 |
| CN | 210056206 U | 2/2020 |
| CN | 211094644 U | 7/2020 |
| CN | 111839713 A | 10/2020 |
| CN | 213216941 U | 5/2021 |
| CN | 214010591 U | 8/2021 |
| DE | 202004008875 U1 | 8/2004 |
| EP | 0292922 B1 | 11/1988 |
| EP | 395307 A2 | 10/1990 |
| EP | 570301 A1 | 11/1994 |
| EP | 0550666 B1 | 1/1999 |
| EP | 919197 B1 | 2/2005 |
| EP | 2593028 B1 | 8/2017 |
| EP | 2904986 B1 | 7/2022 |
| GB | 1108905 A | 4/1968 |
| GB | 1473856 A | 5/1977 |
| GB | 1534472 A | 12/1978 |
| GB | 2321531 A | 7/1998 |
| GB | 2336781 A | 11/1999 |
| GB | 2337000 A | 11/1999 |
| GB | 2409815 A1 | 7/2005 |
| JP | 2004041428 A1 | 2/2004 |
| JP | 2004275732 A | 10/2004 |
| JP | 2007167100 A | 7/2007 |
| WO | 8303961 A1 | 11/1983 |
| WO | 9637158 A1 | 11/1996 |
| WO | 9639960 A1 | 12/1996 |
| WO | 9947876 A1 | 9/1999 |
| WO | 200137919 A2 | 5/2001 |
| WO | 200141683 A3 | 6/2001 |
| WO | 200197702 A1 | 12/2001 |
| WO | 0202026 A1 | 1/2002 |
| WO | 0211638 A1 | 2/2002 |
| WO | 03015651 A1 | 2/2003 |
| WO | 2004051409 A2 | 6/2004 |
| WO | 2004060465 A2 | 7/2004 |
| WO | 2004089183 A1 | 10/2004 |
| WO | 2004093635 A2 | 11/2004 |
| WO | 2005000106 A2 | 1/2005 |
| WO | 2005098308 A1 | 10/2005 |
| WO | 2006116457 A2 | 11/2006 |
| WO | 2006127467 A2 | 11/2006 |
| WO | 2007028232 A1 | 3/2007 |
| WO | 2007076123 A2 | 7/2007 |
| WO | 2007086056 A2 | 8/2007 |
| WO | 2007129308 A2 | 11/2007 |
| WO | 2013067421 A2 | 5/2013 |
| WO | 2014068262 A1 | 5/2014 |
| WO | 2014137383 A1 | 9/2014 |
| WO | 2018184938 A1 | 10/2018 |
| WO | 2019077508 A1 | 4/2019 |
| WO | 2021027682 A1 | 2/2021 |
| WO | 2021258840 A1 | 12/2021 |

OTHER PUBLICATIONS

Zhang et al., "Two phase flow characteristics of liquid nitrogen in vertically upward 0.5 and 1.0 mm micro-tubes: Visualization studies", Cryogenics, vol. 49, issue 10, pp. 565-575, Oct. 2009.
Qi et al., "Development and performance test of a cryoprobe with heat transfer enhancement configuration ", Cryogenics, vol. 46, pp. 881-887, year 2006.
Qi et al., "Flow boiling of liquid nitrogen in micro-tubes: Part I—onset of nucleate boiling, two phase flow instability and two phase flow pressure drop", International Journal of Heat and Mass Transfer, vol. 50, pp. 4999-5016, year 2007.
Qi et al., "Flow boiling of liquid nitrogen in micro-tubes: Part II—heat transfer characteristics and critical heat flux", International Journal of Heat and Mass Transfer, vol. 50, pp. 5017-5030, year 2007.
JP Application # 2022091916 Office Action dated Nov. 22, 2023.
EP Application # 23180921.1 Search Report dated Nov. 22, 2023.
EP Application # 23172909.6 Search Report dated Oct. 5, 2023.
Li et al., "A Compact Cryogenic Pump," Elsevier, open-access version, pp. 1-6, year 2015.
Verkin et al., "Low Temperatures in Stomatology," Naukova Dumka, Kiev, pp. 62-63, year 1990.
Muchnik et al., U.S. Appl. No. 17/866,614, filed Jul. 18, 2022.
EP Application # 23172909.6 Search Report dated Apr. 17, 2024.
JP Application # 2023115854 Office Action dated May 14, 2024.
U.S. Appl. No. 18/184,693 Office Action dated May 23, 2024.
JP Application # 2023088275 Office Action dated Jun. 4, 2024.
U.S. Appl. No. 17/828,128 Non Office Action dated Feb. 21, 2025.
U.S. Appl. No. 17/828,128 Final Office Action dated May 6, 2025.
Castillo-Dominguez et al., "Cryostat and CCD for MEGARA at GTC," Conference Paper in Proceedings of SPIE—The International Society for Optical Engineering, pp. 2-11, Sep. 2012.
Douglas, Jr., et al., "Cryosurgial Denervation of the Heart: Acute and Chronic Effects," The Journal of Thoracic and Cardiovascular Surgery, vol. 100, pp. 198-209, year 1990.
U.S. Appl. No. 17/866,614 Office Action dated Feb. 29, 2024.
First Office Action for Chinese Invention Patent Application No. 2022106325143, dated Oct. 17, 2025.

* cited by examiner

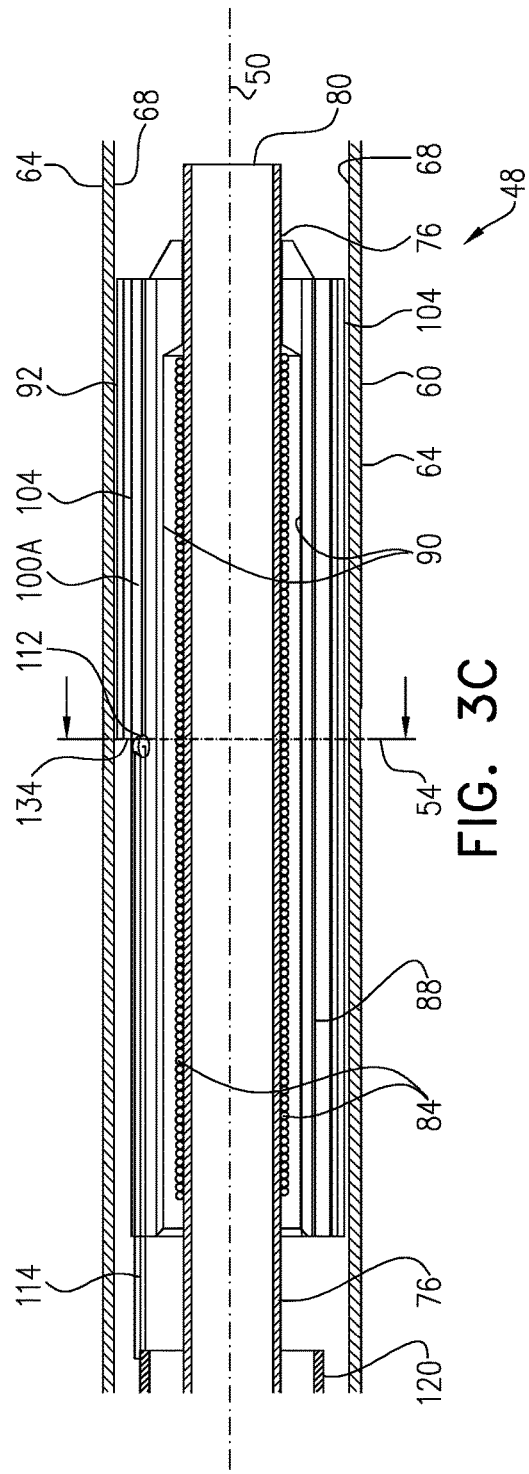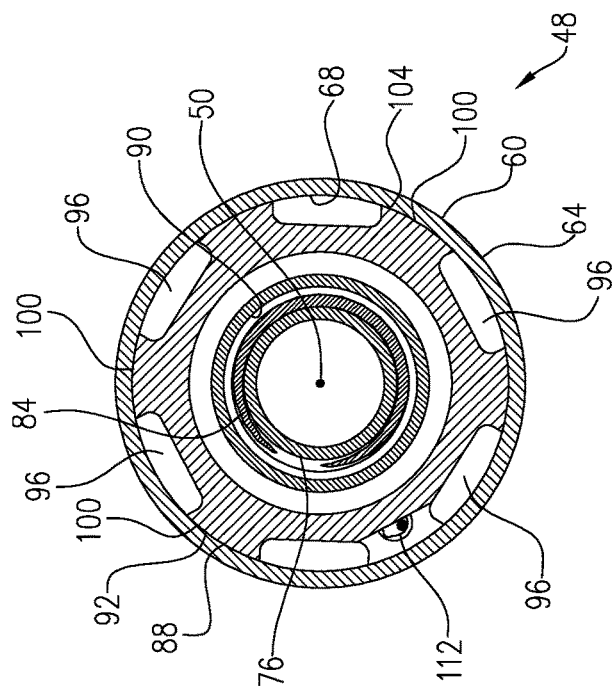

CRYOPROBE

FIELD OF THE INVENTION

This invention relates generally to a probe used to freeze material, and specifically to operating the probe while the material is frozen.

BACKGROUND OF THE INVENTION

Cryoablation is a process that uses extreme cold to destroy tissue. Cryoablation may be performed using a hollow needle, a cryoprobe, through which a cryogen is circulated. The cryoprobe may be positioned in contact with tissue to be destroyed, and then the cryogen is circulated through the probe. Once the tissue has been frozen, the cryoprobe may be withdrawn from the tissue.

SUMMARY OF THE INVENTION

An embodiment of the present invention provides apparatus, consisting of:
a probe including a probe distal end having an external surface configured to contact tissue of a patient when the probe distal end is inserted therein;
a heater, located in the probe distal end;
a temperature sensor, located in the probe distal end;
a gas inlet, coupled to the probe distal end and configured to provide gas thereto; and
a controller, configured, while the heater is activated:
to register a first time when a temperature measured by the sensor equals or exceeds a preset temperature,
in response to the temperature equaling or exceeding the preset temperature, to deliver a pulse of gas through the gas inlet so as to cool the probe distal end,
to register a second time, subsequent to the first time, when the temperature measured by the sensor equals or exceeds the preset temperature, and
in response to a time difference between the second time and the first time, to estimate a temperature of the external surface of the probe distal end.

The apparatus may include a cryogen inlet, coupled to the probe distal end and configured to transfer cryogenic fluid thereto.

In a disclosed embodiment the gas inlet and the cryogen inlet are a common tube, and the controller is configured to operate the common tube as the gas inlet during a first period of time, and to operate the common tube as the cryogen inlet during a second period of time different from the first period of time.

In a further disclosed embodiment the gas is input to the probe as room temperature gas. The room temperature gas may consist of exhaust gas derived from cryogen fluid transferred to the distal end.

In a yet further disclosed embodiment the temperature sensor consists of a thermocouple junction located between the heater and an internal surface of the probe distal end.

In an alternative embodiment the time difference and the temperature of the external surface of the probe distal end are related by a monotonic decreasing function. The monotonic decreasing function may consist of a linear function.

In a further alternative embodiment the pulse of gas is delivered until the temperature measured by the sensor equals a further preset temperature, lower than the preset temperature.

There is further provided, according to an embodiment of the present invention a method, consisting of:

providing a probe including a probe distal end having an external surface configured to contact tissue of a patient when the probe distal end is inserted therein;
locating a heater in the probe distal end;
locating a temperature sensor in the probe distal end;
coupling a gas inlet to the probe distal end, wherein the gas inlet is configured to provide gas to the probe distal end;
activating the heater, and, while the heater is activated:
registering a first time when a temperature measured by the sensor equals or exceeds a preset temperature,
in response to the temperature equaling or exceeding the preset temperature, delivering a pulse of gas through the gas inlet so as to cool the probe distal end,
registering a second time, subsequent to the first time, when the temperature measured by the sensor equals or exceeds the preset temperature, and
in response to a time difference between the second time and the first time, estimating a temperature of the external surface of the probe distal end.

The present disclosure will be more fully understood from the following detailed description of the embodiments thereof, taken together with the drawings, in which:

BRIEF DESCRIPTION OF THE DRAWINGS

FIGS. 3A-3D are schematic diagrams illustrating a distal end of the probe, according to an embodiment of the present invention;

DETAILED DESCRIPTION OF EMBODIMENTS

Overview

Figure 1:
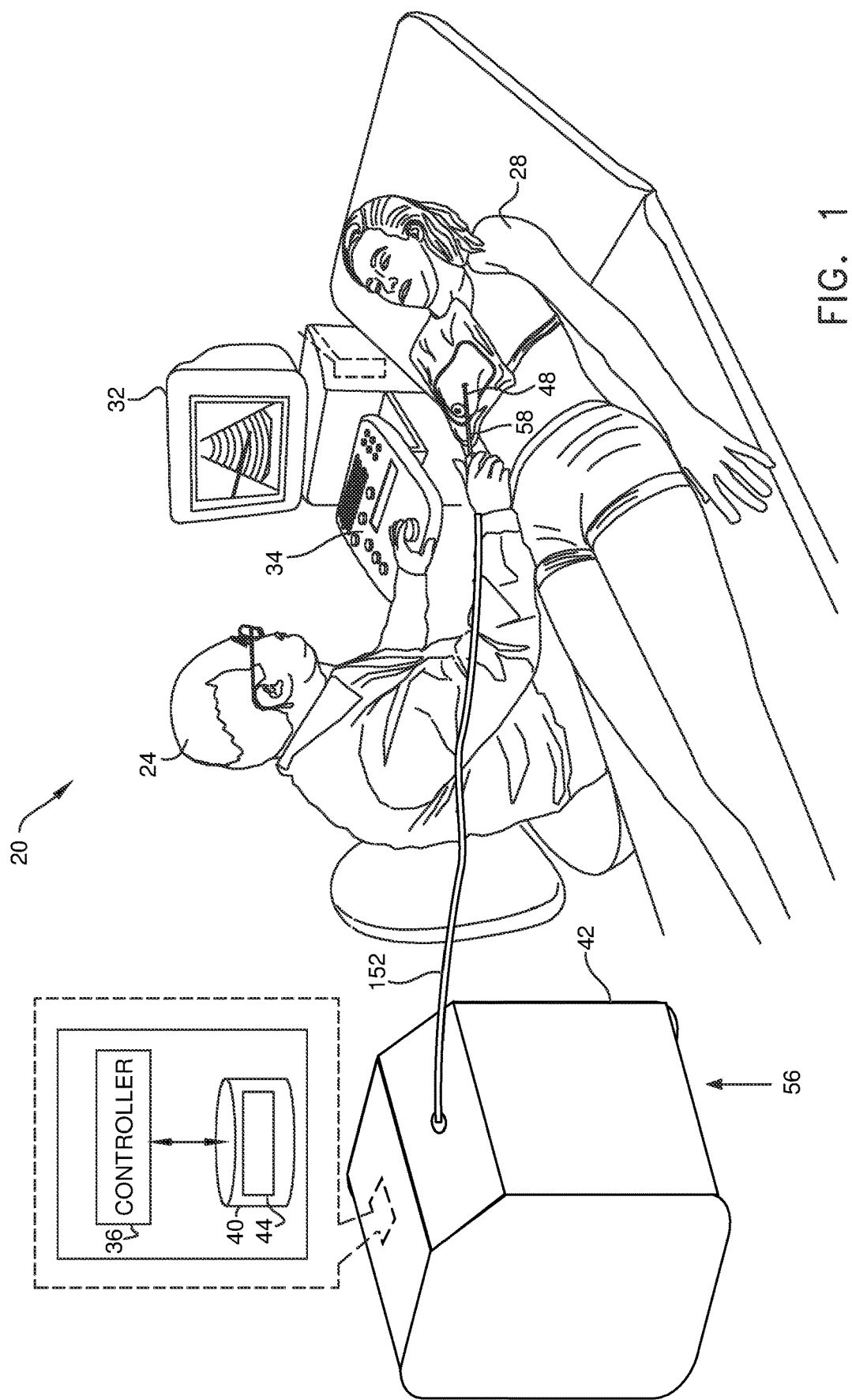
FIG. 1 is a schematic illustration of an apparatus being used for a cryogenic procedure, according to an embodiment of the present invention.

An accepted method for treating a tumor in a patient is to use a cryoprobe; a physician positions a distal end of the cryoprobe into contact with the tumor, and a cryogen, such as liquid nitrogen, is passed through the cryoprobe. The cryogen forms a ball of ice around the probe distal end and the tumor, and the resulting cold temperature freezes and destroys cells of the tumor.

Once the ball of ice has formed, the physician may extract the cryoprobe from the patient. The remaining ball of ice, as well as the destroyed tumor cells, are naturally absorbed by the body of the patient.

However, when the ball of ice initially forms, it sticks to the external surface of a retaining tube of the cryoprobe distal end, and so it is not possible to easily extract the probe. Any attempt to extract the probe while the iceball is stuck to the external surface of the distal end retaining tube typically causes pain to the patient, and can even cause damage to the tissue if a large force is applied.

Embodiments of the invention overcome this problem by incorporating a heating element, as well as a temperature sensor proximate to the heating element, into the probe distal end. In addition, the probe comprises a gas inlet. To extract the probe after the iceball has been formed, the heating element is activated, and the temperature measured by the sensor is registered. When the registered temperature increases to a preset value, a first time is recorded and a first pulse of gas is delivered to the probe. The gas pulse cools the internal portion of the probe distal end, including a portion in contact with the temperature sensor.

Since the heating element is activated, the temperature increases again to the preset value, and a second time at which this occurs is recorded. A second pulse of gas is then delivered to the probe to again cool the probe distal end. The process of pulsing the probe distal end with cooling gas while it is being heated may be repeated iteratively. As is described below, the times are used to provide a metric for the distal end external surface temperature.

(The surface temperature of the distal end external surface is very different from the temperature measured by the junction proximate to the heater, because of the large thermal gradients in the distal end. There is a very low temperature of the iceball of approximately −10° C. or lower, and a high temperature of the heater of approximately +28° C. or higher. Because of physical constraints the temperature sensing junction cannot be located on the outer surface of the distal end.)

The inventors have found that the time difference, between sequential times at which the preset temperature value occurs, provides a good metric for the temperature of the probe distal end external surface: the shorter the time difference, the higher the temperature. Typically, during an iteration, the time differences reduce as the distal end external surface temperature increases.

In an embodiment of the invention, the iterative pulsing described above is repeated until a time difference between sequential times, corresponding to a distal end external surface temperature in an approximate range of 0--10° C., is registered. When such a time difference is registered, a notification may be provided to the physician that the cryoprobe may be extracted from the patient.

Using the time difference described above, as a metric for the distal end external surface temperature, applies regardless of the size of the iceball. Even though different sized iceballs may need different heating times prior to being able to extract the probe, the time difference metric provides a method for automatically detecting when extraction is possible.

The use of the time difference as a metric of temperature is not limited to "ice" temperatures, and may be used for higher temperatures. Thus, in an alternative embodiment, the time difference is measured to test if the probe distal end external surface temperature is approximately 35° C. or more. Such a scenario may occur after the probe has been removed from the patient. If such a higher temperature is registered, the heating element may be automatically deactivated and/or a notification may be provided to the physician that the heater is still active.

DETAILED DESCRIPTION

In the following description, like elements in the drawings are identified by like numerals, and are differentiated as necessary by appending a letter to the numeral.

Reference is now made to FIG. 1, which is a schematic illustration of an apparatus 20 being used for a cryogenic procedure, according to an embodiment of the present invention. By way of example the procedure assumed in the following description is on a breast tumor, but it will be understood that apparatus 20 may be used for other procedures, such as on a prostate or kidney tumor, and all such procedures are considered to be comprised within the scope of the present invention.

The procedure is performed by a physician 24 on a patient 28, and the physician is able to observe results of the procedure on a display 32 comprised in apparatus 20. The physician is also able to interact with elements of apparatus 20 via a keypad or pointing device 34. (Typically the procedure on the breast tumor includes performing a scan, such as an ultrasound, CT (computerized tomography), or MRI (magnetic resonance imaging) scan, of the breast of patient 28, and presenting results of the scan on display 32. The scan is normally performed by a professional, other than physician 24. Details of the scan are not relevant to the present disclosure, and for simplicity the professional is not shown in FIG. 1.)

Apparatus 20 comprises a console 42, within which elements of the apparatus are contained, as is described in more detail below. Apparatus 20 is controlled by a controller 36, coupled to a memory 40 wherein is stored software 44 for operation of the apparatus. Controller 36 and memory 40 are typically installed in console 42, as is illustrated in the figure. Software 44 in memory 40 may be downloaded to the controller in electronic form, over a network, for example. Alternatively or additionally, the software may be provided on non-transitory tangible media, such as optical, magnetic, or electronic storage media.

To perform the procedure, in a first, insertion, phase of the procedure physician 24 inserts a distal end 48 of a cryogenic probe 58 into patient 28. Cryogenic probe 58 is connected by a flexible tube 152 to a cryogen pump 56 in console 42. Cryogenic probe 58, also herein termed cryoprobe 58 or probe 58, and its distal end 48 are described in more detail below with respect to FIGS. 2 and 3A-3D.

Once inserted, physician 24 controls apparatus 20 to transfer a cryogenic fluid, from cryogen pump 56 in console 42, through tube 152 to distal end 48. The cryogenic fluid generates an iceball surrounding the distal end, and the physician controls the flow of cryogenic fluid to the distal end until an iceball of a size desired by the physician in formed. The formation of the desired size iceball concludes the insertion phase of the procedure.

Figure 2:
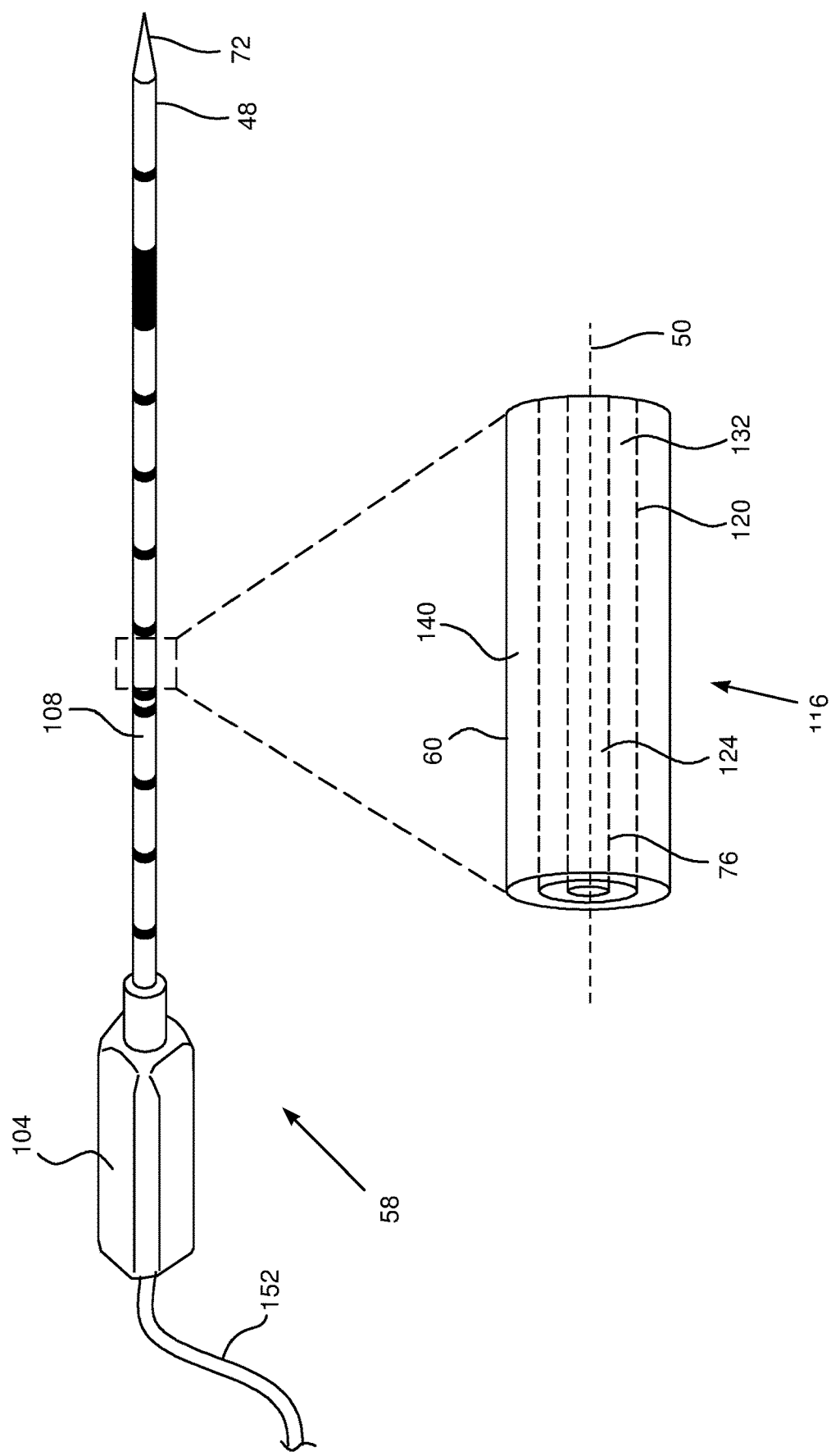
FIG. 2 is a schematic illustration of a probe of the apparatus, according to an embodiment of the present invention.

FIG. 2 is a schematic illustration of probe 58, according to an embodiment of the present invention. As shown in FIG. 2, probe 58 comprises a handle 104, which is attached to a shaft 108 of the probe at a shaft proximal end. Shaft 108 terminates in pointed distal end 48, and, as shown in a section 116, shaft 108 comprises three concentric tubes, typically formed from thin-walled stainless steel, the tubes having a common axis of symmetry 50. A first, inner, tube 76 encloses a central lumen 124, and the inner tube is surrounded by a second tube 120. The first tube and the second tube are separated by an intermediate space 132. A third, outer, retaining tube 60 surrounds second tube 120, and the second and third tubes are separated by a space 140.

Flexible tube 152 has an internal structure generally similar to the internal structure of shaft 108, and is coupled to the shaft via handle 104. Lumens within tube 152 are configured to convey cryogenic fluid from pump 56 to central lumen 124, and to transfer returning cryogenic fluid from intermediate space 132 to the pump.

Figure 3A:
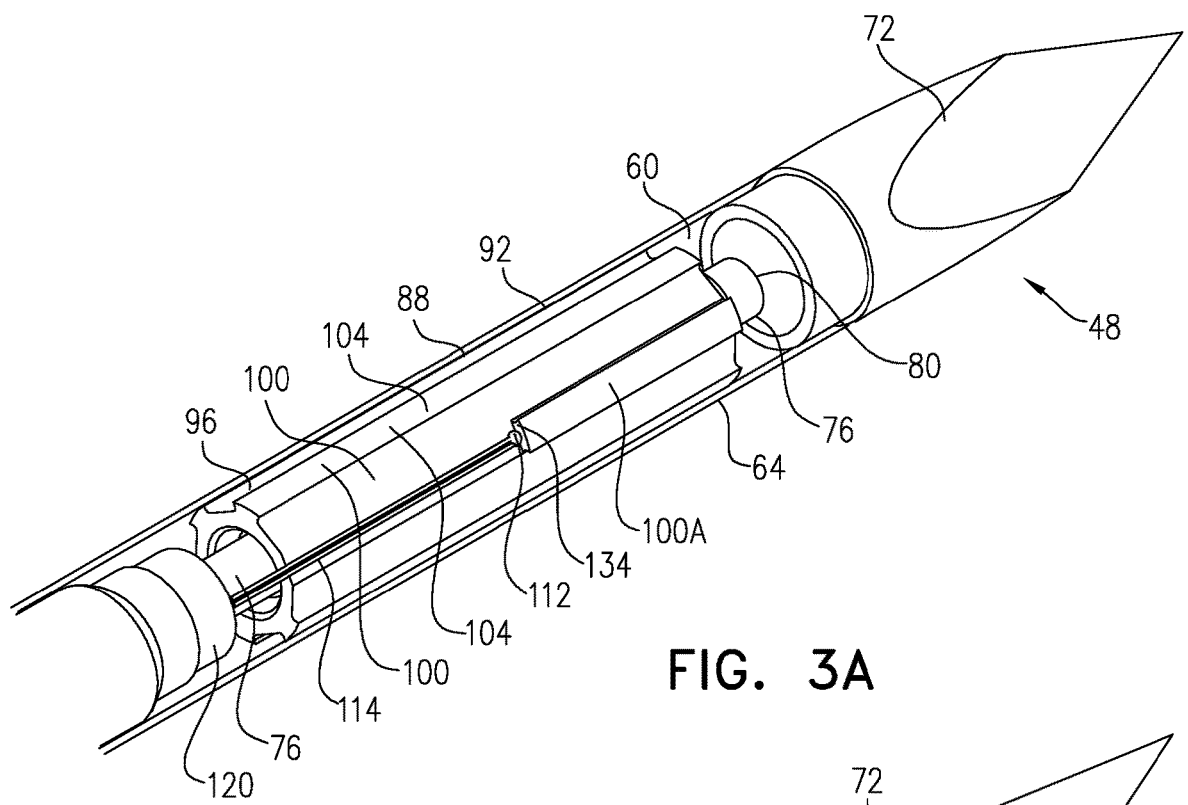
Figure 3B:
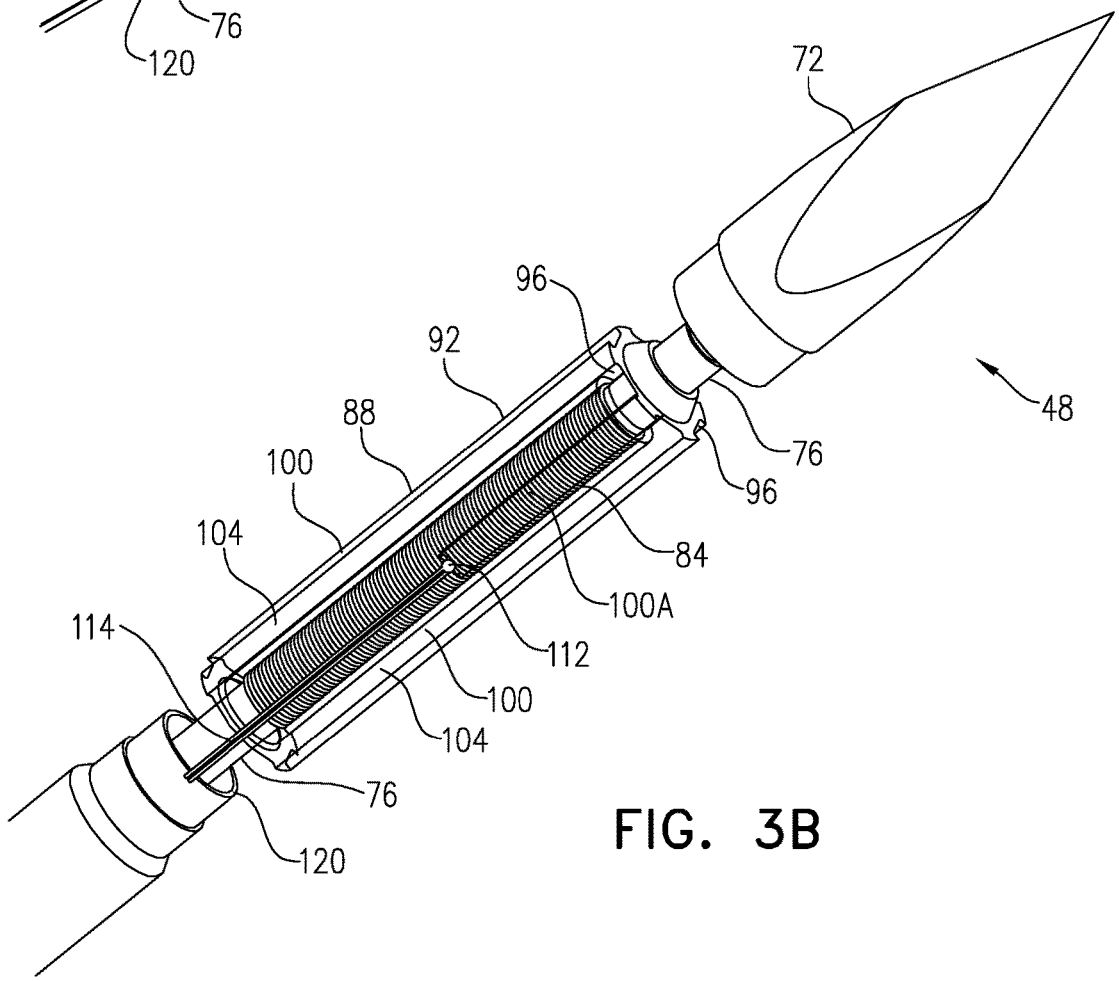

FIGS. 3A-3D are schematic diagrams illustrating distal end 48 of probe 58, according to an embodiment of the present invention. FIGS. 3A and 3B are perspective views of distal end 48. FIG. 3C is a sectional view of distal end 48, taken along axis of symmetry 50 of probe 58, and FIG. 3D is a cross-sectional view of the distal end taken orthogonal to the axis of symmetry and along a plane 54 approximately centered on a heat exchanger 88, described below.

As described above, probe 58 comprises external retaining tube 60, and tube 60 has, in the region of distal end 48, an external surface 64 and an internal surface 68. Fixedly connected to retaining tube 60 is a distal tip 72 of the distal end. For clarity, in FIG. 3A retaining tube 60 is shown as transparent, and is not shown in FIG. 3B. In FIG. 3B heat exchanger 88 is shown as transparent.

Central inner tube 76 has a termination 80 that is proximate to distal tip 72, and in operation of apparatus 20, cryogen pump 56 pumps cryogenic fluid through inner tube 76, and the fluid is expelled from termination 80 into distal tip 72. It will be understood that termination 80 acts as a cryogen fluid inlet for distal end 48; as is explained further below, termination 80 also acts as a gas inlet for the distal end.

At distal end 48 a heater 84, formed of resistance wiring, is wound about inner tube 76. (For simplicity connections to the wiring of heater 84 are not shown in the figures.) Heat exchanger 88 is tubular and has a cylindrical inner surface 90 that encloses heater 84. Heat exchanger 88 has an external ribbed surface 92; surface 92 comprises a plurality of straight substantially similar channels 96 that are parallel to axis of symmetry 50 of probe 58, and that are symmetrically disposed about the axis. In the embodiment illustrated in the figures there are six channels 96, but other embodiments may have more or fewer than six straight channels. Each channel 96 lies between a pair of substantially similar ribs 100 of the heat exchanger, and the heat exchanger is dimensioned so that an external surface 104 of the ribs contacts tube internal surface 68.

One of ribs 100, a rib 100A, is foreshortened in both its length and its depth, and a thermocouple 114, having a junction 112, is located in the foreshortened section. Junction 112 acts as a temperature sensor, and is also herein termed sensor 112. Foreshortened rib 100A has a termination 134, that in one embodiment is located approximately on plane 54, and sensor 112 is positioned at termination 134. It will be understood that sensor 112 registers the temperature of external ribbed surface 92 of heat exchanger 88, and that this temperature is approximately that of tube internal surface 68.

As described above, probe 58 comprises second inner tube 120 that is coaxial with, and larger than, inner tube 76. During the first phase of the procedure, exhaust cryogen fluid from distal tip 72 returns via channels 96 and space 132, between first tube 76 and second tube 120, to pump 56. As stated above, channels 96 are configured to be straight, since the inventor has observed that if channels returning the exhaust cryogen fluid, which typically comprises varying fractions of cryogen gas and cryogen liquid, are not straight, for example, if they comprise spirals, then vibrations occur. If channels 96, are straight, as is illustrated in the embodiment described herein, no vibrations occur during a procedure.

Figure 4:
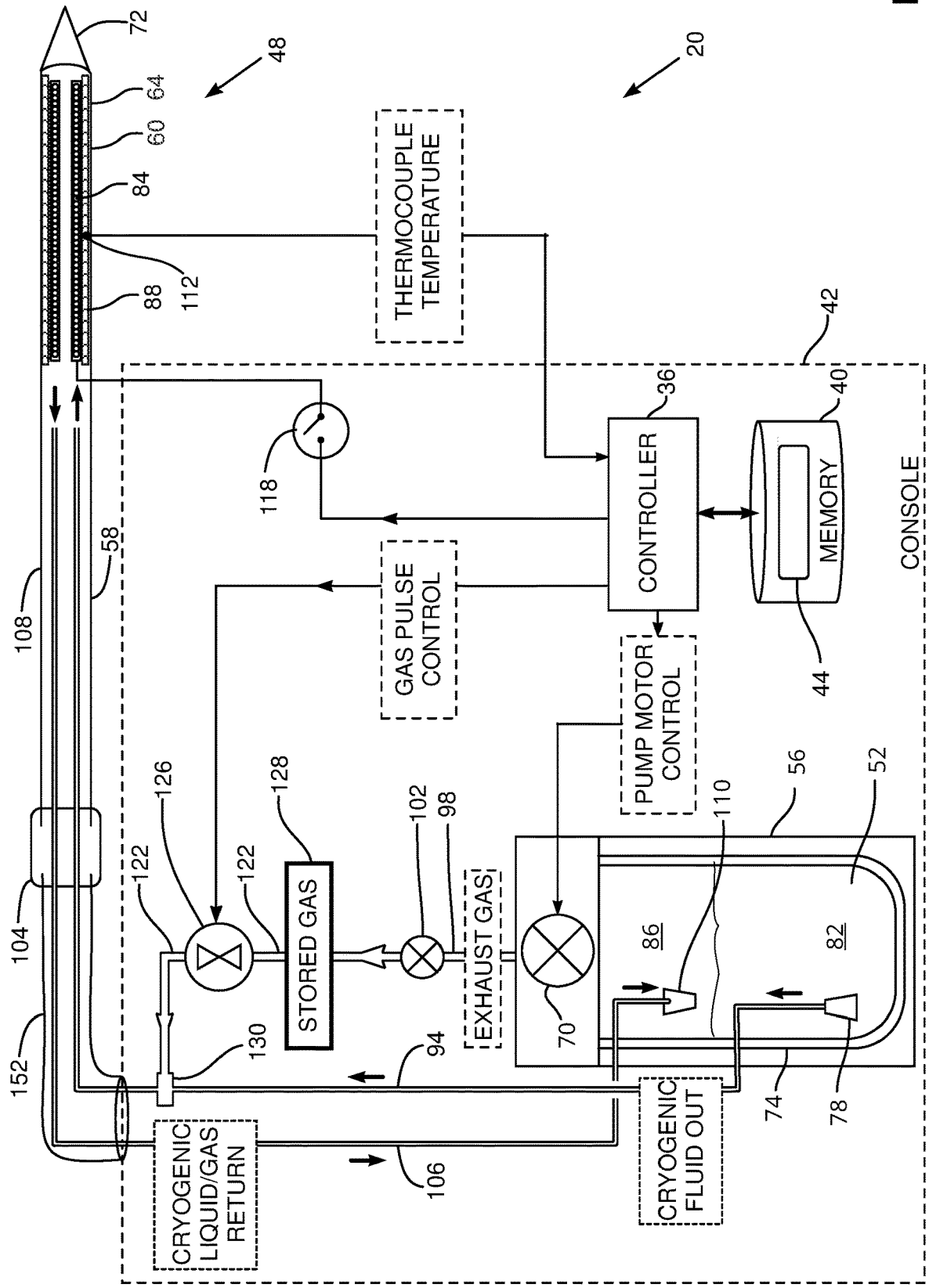
FIG. 4 is a schematic block diagram of the apparatus, according to an embodiment of the present invention.

FIG. 4 is a schematic block diagram of apparatus 20, according to an embodiment of the present invention. As described above, apparatus 20 comprises console 42 and probe 58, and in FIG. 4 elements of console 42 are shown enclosed in a broken line. As illustrated in the figure, cryogen pump 56 comprises a Dewar 74, which, during the procedure being performed by physician 24, holds a liquid cryogen 52. Cryogen 52 is typically liquid nitrogen, but in other embodiments the cryogen may comprise other liquids such as liquid argon.

Pump 56 comprises a motor 70, which drives a piston or a bellows of the pump. For simplicity, the piston or the bellows are not illustrated in the figure. A description of a pump similar to pump 56 is provided in U.S. Pat. No. 11,633,224, which is assigned to the assignee of the current disclosure, and which is incorporated herein by reference. On activation of motor 70, fluid cryogen, typically approximately 100% liquid, exits from a lower space 82 of the Dewar via a one-way valve 78 and an exit tube 94 to probe 58 and distal end 48. Fluid cryogen, typically a gas-liquid mixture, returns via a return tube 106 and a liquid/gas separator 110, which separates returning liquid to lower space 82, and returning gas to an upper space 86 of the Dewar.

During the insertion phase of the procedure described above, i.e., the formation of a desired size iceball, at least some of the gas returning to upper space 86, also herein termed exhaust gas, is removed from the Dewar via an exhaust gas tube 98. A gas compressor 102, connected to tube 98, compresses the exhaust gas into a gas container 128. Pulses of the stored compressed gas from container 128 may be injected into exit tube 94, via a container tube 122 from the container, a solenoid switch 126 in the container tube which is operated by controller 36, and a T-junction 130 connecting the container tube to the exit tube. The pulses of gas are used in a second, extraction, phase of the procedure, as is described below.

At the end of the insertion phase, controller 36 deactivates pump motor 70, so that valve 78 is closed and no cryogen is expelled into tube 94. The extraction phase of the procedure may then be initiated. In the extraction phase, distal end 48 of probe 58 is removed from the patient, while the iceball created in the insertion phase remains. However, at the termination of the insertion phase, the iceball is stuck to distal end 48 so that attempted removal of the distal end would typically cause trauma to the patient. As is described below, embodiments of the present invention provide a method for safely unsticking distal end 48 from the iceball during the extraction phase, so as to permit easy removal of the distal end.

At the beginning of the extraction phase, controller 36 activates heater 84, to begin warming distal end 48, by closing a heating switch 118. While heater 84 is activated, controller 36 monitors the temperature of heat exchanger 88, as registered by thermocouple junction 112.

When the temperature registered by junction 112 reaches a preset temperature value, controller 36 activates solenoid switch 126 to open briefly, so as to deliver a pulse of gas from container 128 into exit tube 94, via T-junction 130. Controller 36 also records the time at which the preset temperature value is reached. In an exemplary embodiment the preset temperature is set at approximately 40° C., and solenoid switch 126 closes when the temperature registered by junction 112 reduces to another preset value, which in the exemplary embodiment is approximately 35° C. Typically solenoid switch 126 stays open for a period of approximately 1-3 seconds, this period corresponding to the time during which the gas pulse is delivered.

The pulse of gas delivered from container 128 into exit tube 94 comprises approximately room temperature gas. The pulse of gas traverses exit tube 94 towards distal end 48 (the gas cannot travel towards pump 56 because valve 78 is closed). Within distal end 48 some of the heat energy of the gas pulse transfers to heat the iceball contacting external surface 64, and in turn the gas pulse cools. Even though heat exchanger 88 is transferring heat from heater 84, and so is being heated, the cooled gas pulse reduces the temperature of the heat exchanger, and so reduces the temperature registered by junction 112.

Once the gas pulse has traversed and exited distal end 48, since heater 84 is still activated, the temperature registered by junction 112 begins to rise until the preset temperature value is again reached. At this point a pulse of gas is again delivered.

Embodiments of the present invention use the repetitive, iterative process of delivering gas pulses to estimate a temperature of external surface 64. For a probe such as probe 58 that has been calibrated, the estimate is based on measuring the time difference between a sequence of pulses for a given preset temperature. The calibration process, and how the calibrated probe is used, are described below.

Figure 5:
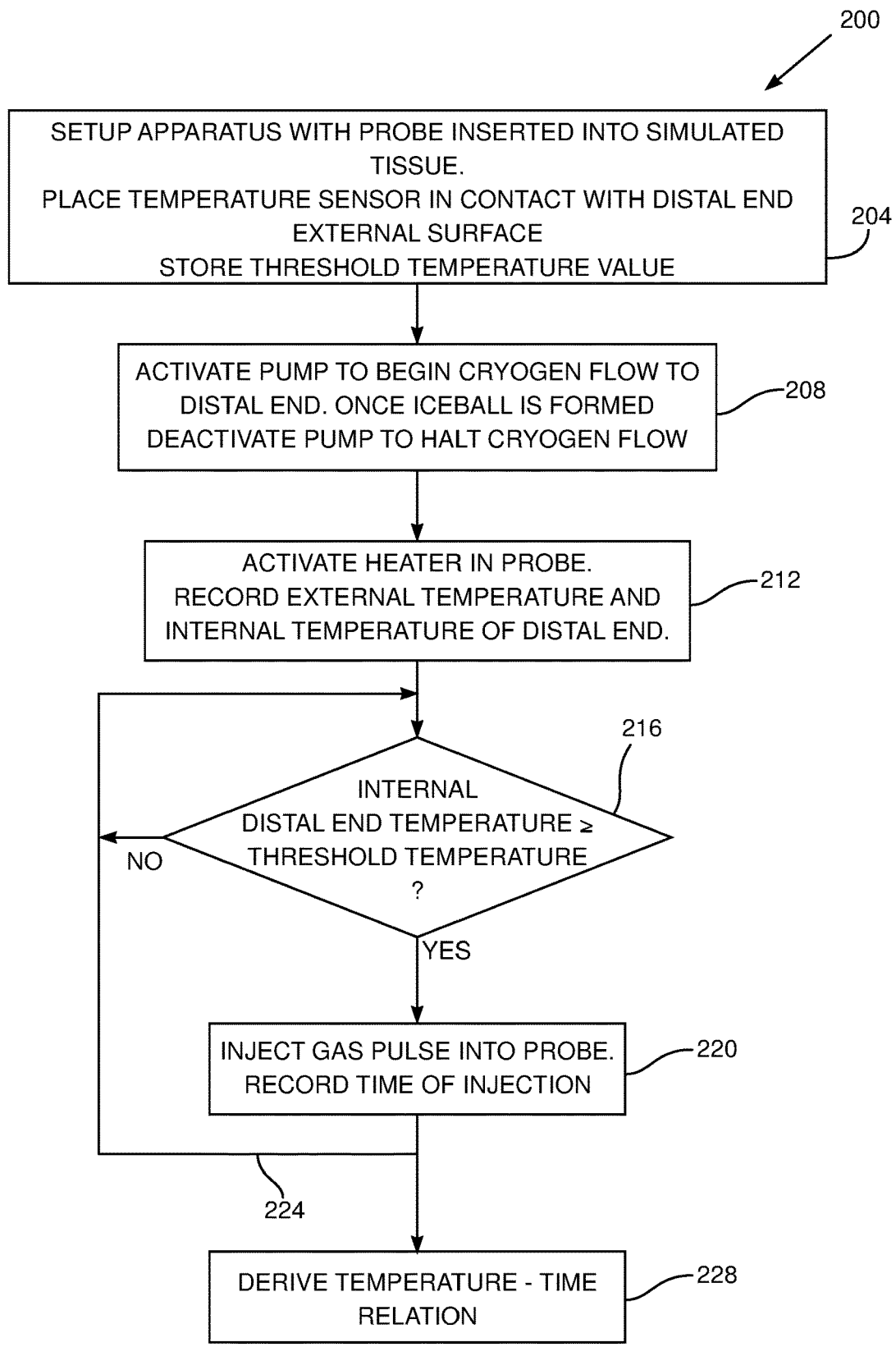
FIG. 5 is a flowchart of steps for calibrating the probe, according to an embodiment of the present invention.
Figure 6:
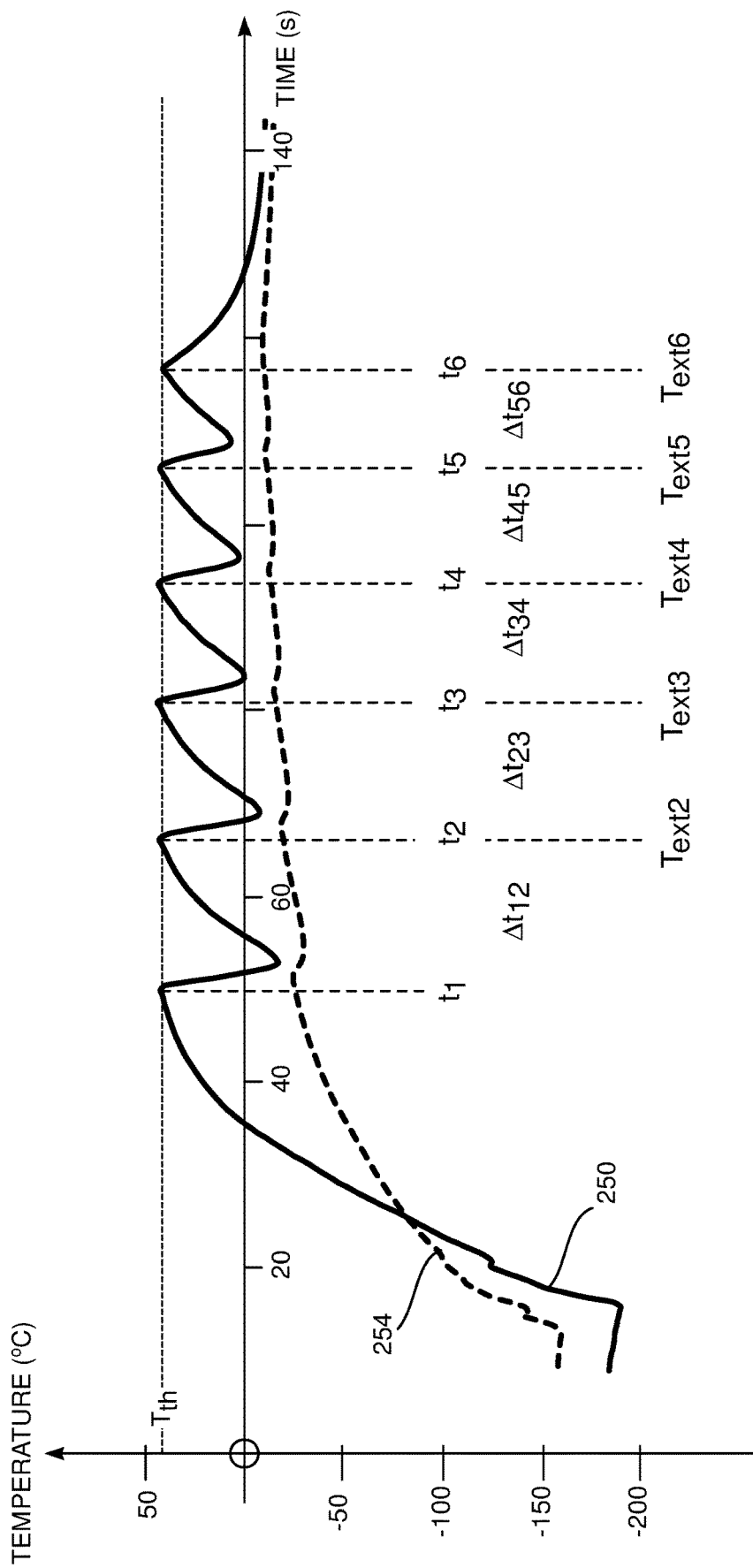
FIG. 6 is a temperature vs. time graph illustrating steps of the flowchart, according to an embodiment of the present invention.

FIG. 5 is a flowchart 200 of steps for calibrating probe 58, and FIG. 6 is a temperature vs. time graph illustrating the steps, according to an embodiment of the present invention.

In a setup step 204, apparatus 20 is configured as shown in FIG. 4. Distal end 48 of probe 58 is inserted into material having similar properties to those of human tissue, and a temperature sensor, herein assumed to comprise a thermocouple junction, is placed in contact with external surface 64 of the distal end.

Also in step 204, a value of the preset temperature, herein also referred to as the threshold temperature $T_{th}$, is stored in software 44 in memory 40. In one embodiment the threshold temperature $T_{th}$ is set at approximately 40° C., as described above, but other embodiments may have the threshold temperature $T_{th}$ smaller or greater than 40° C.

In a freeze step 208, which simulates the first, insertion, phase of the procedure referred to above, pump 56 is activated so that cryogen is transferred to distal end 48, so as to initiate formation of an iceball around the distal end. The activation is continued until an iceball having a diameter in a range of approximately 40 mm-approximately 50 mm is formed, at which point the activation of pump 56 is halted, so that no further cryogen is transmitted to the distal end.

In an activate heater step 212, simulating the beginning of the second, extraction, phase of the procedure, controller 36 activates heater 84 using switch 118. The controller begins recording the temperature provided by junction 112, and the temperature of external surface 64 of the distal end, and stores the recorded temperatures. In the following description the temperature provided by junction 112 is also termed the internal distal end temperature, $T_{int}$, and the temperature of external surface 64 of the distal end is also termed the external distal end temperature, $T_{ext}$. The controller also registers the times at which the temperatures are recorded.

In a decision step 216, for each internal distal end temperature recorded, the controller checks if the recorded internal distal end temperature is greater than or equal to the threshold temperature $T_{th}$. If the decision returns positive, control continues to a pulse step 220, wherein controller 36 activates solenoid 126 to inject a pulse of gas into probe 58, and records the time of injection. If the decision returns negative, control returns to the decision step.

In pulse step 220 solenoid 126 may be activated according to the description of the exemplary embodiment above.

As illustrated in the chart by an arrow 224, decision step 216 and pulse step 220 are reiterated, typically until the external distal end temperature is close to 0° C.

FIG. 6 illustrates graphs of temperature vs. time generated during the reiterative process. A graph 250 shows the internal distal end temperature, $T_{int}$, vs. time; a graph 254 shows the external distal end temperature, $T_{ext}$, vs. time. Graph 250 shows six iterations, at times $t_1, t_2, \ldots t_6$, at each of which times a gas pulse is injected, causing the value of $T_{int}$ to drop sharply.

Once the iterations of steps 216 and 220 have completed, the flowchart continues to an analysis step 228.

In analysis step 228 controller 36 performs the following calculations:

Recall the times when a gas pulse is injected; in graph 250 there are six times $t_1, t_2, \ldots t_6$.

Calculate the time periods between sequential pulses; in graph 250 there are five time periods $\Delta t_{12}, \Delta t_{23}, \Delta t_{34}, \Delta t_{45}, \Delta t_{56}$.

Identify an external distal end temperature $T_{ext}$ for each of the time periods. In one embodiment the temperatures at the end of each time period is identified; in graph 254 there are five such temperatures, herein termed $T_{ext2}, T_{ext3}, T_{ext4}, T_{ext5}, T_{ext6}$.

Formulate and store a correspondence relating the time periods and the identified external distal end temperatures. In an embodiment the correspondence comprises a lookup table; alternatively or additionally, the correspondence comprises an algebraic relationship such as is exemplified in equation $$T_{ext} = F(\Delta t) \tag{1}$$

where $T_{ext}$ is the external distal end temperature, $\Delta t$ is the time period between sequential times of injection, and F( ) is a function relating the temperature and the time period.

In some embodiments function F( ) is a monotonically decreasing function, i.e., as the temperature $T_{ext}$ increases, the time period $\Delta t$ decreases.

In a disclosed embodiment function F( ) is a linear monotonically decreasing function, i.e., equation (1) may be written as equation (2):

$$T_{ext} = -m \cdot \Delta t + c \tag{2}$$

where $T_{ext}$, $\Delta t$ are as defined above for equation (1), and m and c are positive numbers that may be generated during the calibration process of FIG. 5.

Once probe 58 has been calibrated, the correspondence generated may be used in implementing an algorithm for a procedure such as that illustrated in FIG. 1. The algorithm, described below with respect to FIG. 7, measures time periods between sequential pulses, and estimates the external distal end temperature using the measured time periods.

Figure 7:
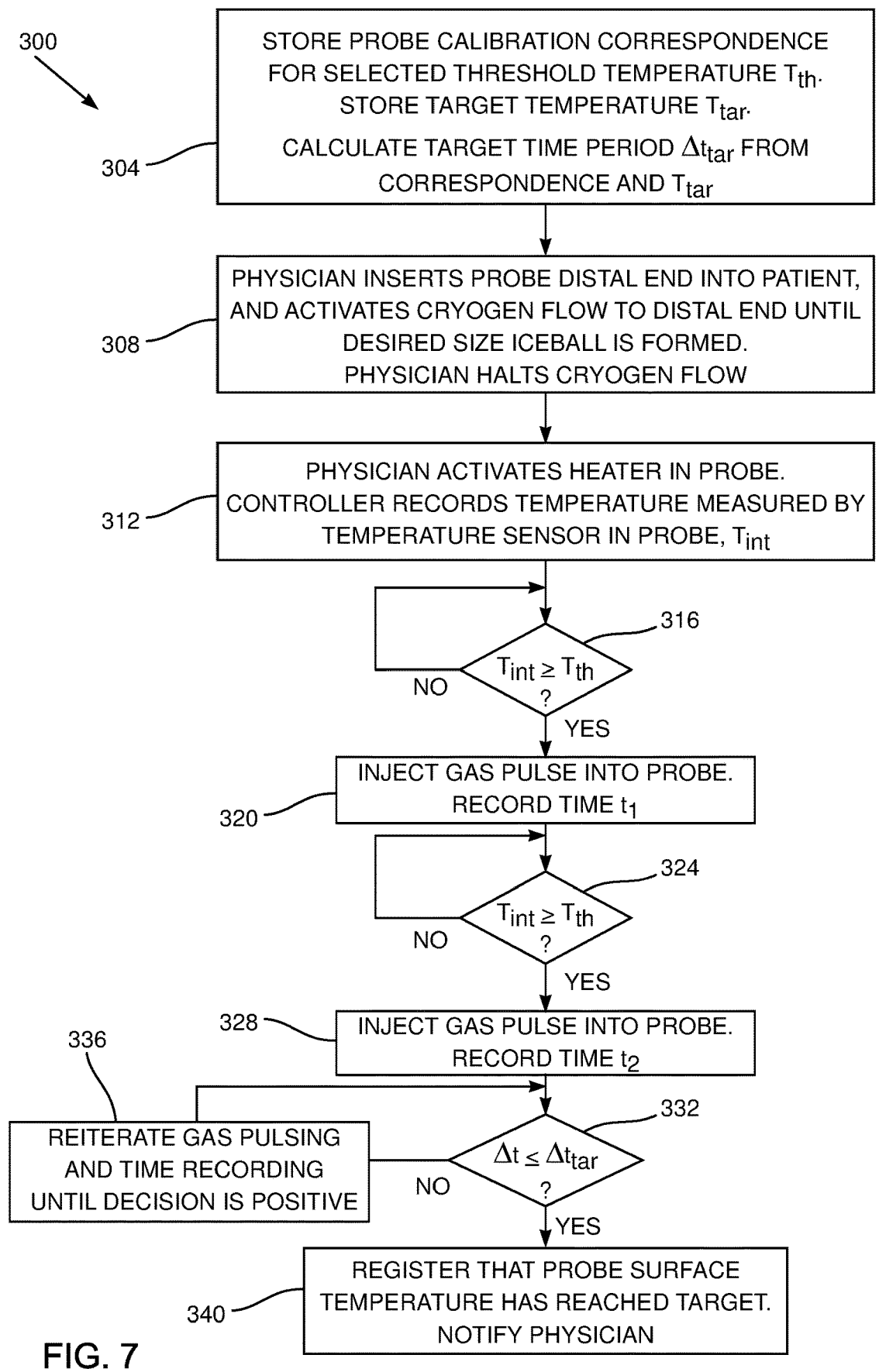
FIG. 7 is a flowchart of actions performed when the apparatus is used in a cryogenic procedure, according to an embodiment of the present invention.

FIG. 7 is a flowchart 300 of actions performed when apparatus 20 is used in a cryogenic procedure, according to an embodiment of the present invention. The flowchart describes an algorithm illustrating how physician 24 may be notified that the external distal end temperature of distal end 48, i.e., the temperature of external surface 64, has reached a value, herein termed a target temperature value, $T_{tar}$, wherein probe 58 is suitable for extraction. In an embodiment temperature $T_{tar}$ is set at approximately −5° C., but other embodiments may have target temperature values higher or lower than −5° C.

In an initial step 304, the calibration correspondence for probe 58, formulated as described in flowchart 200, is stored in software 44 in memory 40 for a selected threshold temperature $T_{th}$. For clarity, in the following description the correspondence is assumed to be in the form of equation (2), and those having ordinary skill in the art will be able to adapt the description, mutatis mutandis, for other forms of correspondence. For example, if the correspondence is in the form of a lookup table, controller 36 may use interpolation and/or extrapolation to derive values not in the table.

In addition, the value of the target temperature $T_{tar}$ is stored in software 44, and from the stored correspondence controller 36 calculates a target time period $\Delta t_{tar}$ corresponding to the target temperature $T_{tar}$. In one embodiment $\Delta t_{tar}$ is approximately 12 s.

In a freeze step 308, physician 24 inserts distal end 48 of probe 58 into patient 28. The physician then activates pump 56 so that cryogen is transferred to distal end 48, so as to initiate formation of an iceball around distal end 48. The activation is typically performed discontinuously, i.e., pump, then pause, then pump again. The activation is continued until an iceball of a desired size is formed, at which point the physician halts the activation of pump 56, so that no further cryogen is transmitted to the distal end.

Once the actions of the freeze step have been implemented, so that the first phase of the procedure has been performed, physician 24 is able to perform the second, extraction, phase of the procedure.

In a first step 312 of the extraction phase, physician 25 activates heater 84, to begin warming distal end 48, by having controller 36 close heating switch 118. On activation of the heater, controller 36 begins monitoring the internal distal end temperature, $T_{int}$, registered by thermocouple junction 112.

In a first decision step 316, controller 36 checks if the expression $T_{int} \geq T_{th}$ is valid. If the expression is not valid, i.e., the expression returns negative, the checks continue. If the expression is valid, so the return is positive, the flowchart continues to a first pulse step 320.

In pulse step 320 controller 36 activates solenoid switch 126 to inject a pulse of gas into probe 58. The activation may be according to the exemplary embodiment described above. The controller also records the time when decision step 316 returned positive, i.e., when the internal distal end temperature, $T_{int}$, equals or exceeds the threshold temperature, $T_{th}$.

The flowchart continues to a second decision step 324, which is substantially the same as first decision step 316, i.e., controller 36 checks if the expression $T_{int} \geq T_{th}$ is valid. If the expression is not valid the checks continue. If the expression is valid the flowchart continues to a second pulse step 328.

Pulse step 328 is substantially the same as first pulse step 320. I.e., controller 36 activates solenoid switch 126 to inject a pulse of gas into probe 58. The controller also records the time when decision step 324 returned positive.

The flowchart continues to a third decision step 332, wherein controller 36 checks if a time period, $\Delta t$, between previous sequential times of gas pulsing is less than or equal to the target time period, $\Delta t_{tar}$, calculated in step 304.

If decision step 332 returns negative, then, in a reiteration step 336, the process of checking if the expression $T_{int} \geq T_{th}$ is valid, and pulsing with gas when it is valid, reiterates. The reiteration continues until decision step 332 returns positive, i.e., until the time period between sequential gas pulses is less than or equal to the target time period, $\Delta t_{tar}$.

When decision step 332 returns positive, so that the expression $\Delta t \leq \Delta t_{tar}$ is valid, the flowchart continues to a final step 340.

In step 340 controller 36 registers that the external distal end temperature of distal end 48, $T_{ext}$, has reached the target temperature value, $T_{tar}$, and the controller may notify physician 26 that the target temperature has been reached and that probe 58 is in a state that is suitable for extraction. The notification may be any convenient means known in the art, such as presenting a notice on display 32.

The description above illustrates how embodiments of the invention may be used to measure the temperature of external surface 64 of distal end 48, when the measured temperatures are "ice" temperatures, i.e., temperatures that are approximately 0° C. However, it will be understood that embodiments of the invention may be used to measure temperatures outside this range.

For example, a target temperature $T_{tar}$ for external surface 64 may be set at 40° C., and controller 36 may calculate a corresponding value of $\Delta t_{tar}$. The steps of flowchart 300 may then be followed, and in final step 340 an appropriate notification may be provided to physician 26, for example, that heater 84 is still activated. Alternately or additionally, in final step 340 controller 36 may be configured to automatically deactivate the heater.

As used herein, the terms "about" or "approximately" for any numerical values or ranges indicate a suitable dimensional tolerance that allows the part or collection of components to function for its intended purpose as described herein. More specifically, "about" or "approximately" may refer to the range of values ±20% of the recited value, e.g. "approximately 80%" may refer to the range of values from 64% to 96%.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Apparatus, comprising:
    a probe comprising a probe distal end having an external surface configured to contact tissue of a patient when the probe distal end is inserted therein;
    a heater, located in the probe distal end;
    a temperature sensor, located in the probe distal end;
    a gas inlet, coupled to the probe distal end and configured to provide gas thereto; and
    a controller, configured, while the heater is activated:
    to register a first time when a temperature measured by the sensor equals or exceeds a preset temperature,
    in response to the temperature equaling or exceeding the preset temperature, to deliver a pulse of gas through the gas inlet so as to cool the probe distal end,
    to register a second time, subsequent to the first time, when the temperature measured by the sensor equals or exceeds the preset temperature, and
    in response to a time difference between the second time and the first time, to estimate a temperature of the external surface of the probe distal end.

2. The apparatus according to claim 1, and comprising a cryogen inlet, coupled to the probe distal end and configured to transfer cryogenic fluid thereto.

3. The apparatus according to claim 2, wherein the gas inlet and the cryogen inlet comprise a common tube, and wherein the controller is configured to operate the common tube as the gas inlet during a first period of time, and to operate the common tube as the cryogen inlet during a second period of time different from the first period of time.

4. The apparatus according to claim 1, wherein the gas is input to the probe as room temperature gas.

5. The apparatus according to claim 4, wherein the room temperature gas comprises exhaust gas derived from cryogen fluid transferred to the distal end.

6. The apparatus according to claim 1, wherein the temperature sensor comprises a thermocouple junction located between the heater and an internal surface of the probe distal end.

7. The apparatus according to claim 1, wherein the time difference and the temperature of the external surface of the probe distal end are related by a monotonic decreasing function.

8. The apparatus according to claim 7, wherein the monotonic decreasing function comprises a linear function.

9. The apparatus according to claim 1, wherein the pulse of gas is delivered until the temperature measured by the sensor equals a further preset temperature, lower than the preset temperature.

10. A method, comprising:
providing a probe comprising a probe distal end having an external surface configured to contact tissue of a patient when the probe distal end is inserted therein;
locating a heater in the probe distal end;
locating a temperature sensor in the probe distal end;
coupling a gas inlet to the probe distal end, wherein the gas inlet is configured to provide gas to the probe distal end;
activating the heater, and, while the heater is activated:
registering a first time when a temperature measured by the sensor equals or exceeds a preset temperature, in response to the temperature equaling or exceeding the preset temperature, delivering a pulse of gas through the gas inlet so as to cool the probe distal end,
registering a second time, subsequent to the first time, when the temperature measured by the sensor equals or exceeds the preset temperature, and
in response to a time difference between the second time and the first time, estimating a temperature of the external surface of the probe distal end.

11. The method according to claim 10, and comprising coupling a cryogen inlet to the probe distal end, and configuring the cryogen inlet to transfer cryogenic fluid to the probe distal end.

12. The method according to claim 11, wherein the gas inlet and the cryogen inlet comprise a common tube, the method comprising operating the common tube as the gas inlet during a first period of time, and operating the common tube as the cryogen inlet during a second period of time different from the first period of time.

13. The method according to claim 10, wherein the gas is input to the probe as room temperature gas.

14. The method according to claim 13, wherein the room temperature gas comprises exhaust gas derived from cryogen fluid transferred to the distal end.

15. The method according to claim 10, wherein the temperature sensor comprises a thermocouple junction located between the heater and an internal surface of the probe distal end.

16. The method according to claim 10, wherein the time difference and the temperature of the external surface of the probe distal end are related by a monotonic decreasing function.

17. The method according to claim 16, wherein the monotonic decreasing function comprises a linear function.

18. The method according to claim 10, wherein the pulse of gas is delivered until the temperature measured by the sensor equals a further preset temperature, lower than the preset temperature.

* * * * *